United States Patent [19]

Stuart

[11] Patent Number: 5,370,999
[45] Date of Patent: Dec. 6, 1994

[54] TREATMENT OF FIBROUS LIGNOCELLULOSIC BIOMASS BY HIGH SHEAR FORCES IN A TURBULENT COUETTE FLOW TO MAKE THE BIOMASS MORE SUSCEPTIBLE TO HYDROLYSIS

[75] Inventor: Earnest D. Stuart, Brenham, Tex.

[73] Assignee: Colorado State University Research Foundation, Fort Collins, Colo.

[21] Appl. No.: 991,745

[22] Filed: Dec. 17, 1992

[51] Int. Cl.$^5$ .................. C12P 19/14; C12P 19/02; D21C 1/00
[52] U.S. Cl. .................. 435/99; 435/105; 435/277
[58] Field of Search .................. 435/277, 99, 105

[56] References Cited

U.S. PATENT DOCUMENTS

| | | | |
|---|---|---|---|
| 1,313,403 | 8/1919 | Marsden | 435/277 |
| 2,191,977 | 2/1940 | Schneider et al. | 435/277 |
| 4,333,617 | 6/1982 | Zucker et al. | 241/1 |
| 4,409,329 | 10/1983 | Silver | 435/105 |
| 4,564,595 | 1/1986 | Neves | 435/163 |
| 4,600,590 | 7/1986 | Dale | 426/69 |
| 4,923,565 | 5/1990 | Fuentes et al. | 162/72 |
| 4,980,023 | 12/1990 | Salkinoja-Salonen | 162/135 |
| 4,997,488 | 3/1991 | Gould et al. | 127/37 |
| 5,037,663 | 8/1991 | Dale | 426/669 |
| 5,116,474 | 5/1992 | Fuentes et al. | 162/71 |
| 5,175,275 | 12/1992 | Dobashi et al. | 536/56 |

FOREIGN PATENT DOCUMENTS

| | | |
|---|---|---|
| 0202915 | 11/1986 | European Pat. Off. |
| 3150750 | 6/1983 | Germany |
| 3211346 | 9/1983 | Germany |
| 3545746 | 6/1987 | Germany |

OTHER PUBLICATIONS

Dale et al., "A Freeze-Explosion Technique for Increasing Cellulose Hydrolysis," Biotech. & Bioeng. Symp. No. 12:31-43 (1982).
Park et al., "Effects of Nonionic Surfactant on Enzymatic Hydrolysis of Used Newspaper," Biotechnology and Bioengineering, vol 39:117-120 (1992).
Dale, "Cellulose Pretreatments: Technology and Techniques," Colorado State University, Annual Reports on Fermentation Processes, vol. 8, Chap. 11, p. 299 (1985).
Thompson et al., "Comparison of Pretreatment Methods on the Basis of Available Surface Area," Bioresource Technology, vol. 39:155-163 (1992).
Nystrom, "Discussion of 'Pretreatments to Enhance Enzymatic and Microbiological Attack of Cellulosic Materials,'" Biotechnol. & Bioeng. Symp., vol. 5:221-224 (1975).
Diaz, "Discussion of 'Domestic Cellulose Waste,'" Biotechnol. & Bioeng. Symp., vol. 5:23-26 (1975).
Superaton® "Homogenization, Dispersion and Reaction Machines" brochure, Dorr-Oliver Deutschland GmbH (1987).
Dellwg et al., "Ethanol Fermentation: Suggenstions for Process Improvements," Process Biochemistry, pp. 100-104 (Aug. 1988).

*Primary Examiner*—David M. Naff
*Assistant Examiner*—Michael V. Meller
*Attorney, Agent, or Firm*—Arnold, White & Durkee

[57] ABSTRACT

High-shear, microcavitation is used to shred and disintegrate fibrous lignocellulose-containing biomass to make the biomass more susceptible to hydrolysis. This process is preferably done with the biomass particles dispersed in a slurry created using only water. The process can be performed on slurries created with other liquids such as liquid ammonia, aqueous solutions of acid or alkali reagents, or enzyme solutions containing cellulase. High-shear microcavitation is carried out by subjecting the slurry to high-shear forces by injecting the slurry cross currently into a turbulent Couette flow created in a high-frequency, rotor-stator device. This microcavitation shatters the fibrous structure of the biomass in the slurry thereby creating a sheared slurry. The device has a chamber containing a fixed stator equipped with coaxial toothed rings meshing with opposing coaxial toothed rings coupled to a rotor that is coupled to a rotatable shaft.

17 Claims, 7 Drawing Sheets

TREATMENT OF FIBROUS LIGNOCELLULOSIC BIOMASS BY HIGH SHEAR FORCES IN A TURBULENT COUETTE FLOW TO MAKE THE BIOMASS MORE SUSCEPTIBLE TO HYDROLYSIS

BACKGROUND OF THE INVENTION

1. Field Of the Invention

The present invention relates to improvements in methods for treating fibrous lignocellulose-containing biomass prior to refining the biomass. The purpose of the invention is to increase the digestibility and chemical reactivity of the substrate resulting from the treatment. The invention is particularly directed to the use of a shearing technique which penetrates the fibers in a biomass and renders the cellulose more accessible for hydrolysis.

2. Description of the Prior Art

Lignocellulose-containing material can be refined to sugars, protein, and lignin. While protein and lignin extraction methods have been effective, commercial sugar yields historically are well below the theoretical level. This is thought to be due to the close physical and chemical association between lignin and cellulose and hemicellulose within the cell wall of woody plants. This close association or bonding reduces the availability of the cellulose for hydrolysis. Additionally, when cellulose molecules exhibit a high degree of crystallinity in their structure they are even more resistant to hydrolysis. As a result, a great deal of effort has been directed toward overcoming these problems and thereby increasing sugar yields. Most of this effort has been directed toward finding methods for the removal of lignin and hemicellulose and the disruption and destruction of the crystalline structure of the cellulose molecule.

A key to increasing the sugar yields from lignocellulose-containing biomass is to increase access to cellulose and hemicellulose by the enzymes or other chemical or biological agents used to hydrolyze the cellulose into sugar. Thus, attempts have been made to destroy the fibrous structure of the biomass and thereby increase the reactive surface area of the resulting substrate. The greater the reactive surface area of the substrate, i.e., the treated biomass, the more access that the enzymes or other agents have to the cellulose in the substrate.

Many different techniques have been used to treat lignocellulosic biomass specifically to increase the reactive surface area of the resulting substrate. These techniques have resulted in varying degrees of effectiveness.

Concentrated acid has been used to chemically hydrolyze fibrous biomass. Biomass and the acid are combined, forming a broth. The broth is held in a vat at ambient temperature for a period of time sufficient to break down the biomass and hydrolyze the cellulose, hemicellulose, proteins and lignin. While effectively breaking down the biomass and hydrolyzing the cellulose and hemicellulose, this process creates the difficult problem of separating the sugars from the acid. Presently, there is no efficient and economical way to separate the sugars and acid, making this process undesirable for a commercial application. Furthermore, concentrated acid is corrosive and requires extreme care in handling.

Dilute acid has been used in a process to promote the disintegration of fibrous biomass. Biomass and dilute acid are combined, forming a broth. The broth is "cooked" at high temperature causing the hemicellulose to hydrolyze. The acid must then be neutralized and washed out of the mix. Following the removal of the acid, the remaining biomass is treated with high enzyme loadings, in excess of 20 IU's/gram of substrate, to hydrolyze the cellulosic fraction.

Washing the acid out of the mix creates a waste stream that must be treated prior to discharge from the processing facility. "Cooking" at high temperature causes formation of furfural and hydroxymethyl furfural in the sugar component of the mix. Furfural and hydroxymethyl furfural are toxic and must be separated from the desirable sugars. Steps have been taken to minimize furfural production through a two-stage/two-temperature approach. First, a lower temperature hydrolyzes the $C_5$ sugars, which are removed. Then the remaining fiber is subjected to higher temperatures for decrystallization and delignification.

Separating the acids and other toxic products from the desirable sugars is difficult and expensive, limiting the usefulness of this process. The use of acids also raises environmental issues because they are considered pollutants.

Steam has been used to disintegrate and defiberize biomass. This is done under high pressure and at a high temperature exploding the fibers within the biomass. Because this procedure must be done at high temperatures, degradation products such as furfural and hydroxymethyl furfural are created. These degradation products are toxic and must be removed prior to fermentation of any sugars produced from the exploded materials. The water wash streams used to remove the degradation products become toxic themselves and must be treated before they can be discharged from the processing facility. Besides the environmental cost, the use of steam is extremely costly because of the energy that is required which is not recoverable, and because of the equipment costs that are required to practice this technique.

Ammonia has also been used to explode and disintegrate fibrous biomass. This technique, known as AFEX, is performed under high pressure. The pressure and temperature required are dependent upon the substrate being treated. The process is generally performed at temperatures from 50°–110° C. This process does not degrade sugars and suffers from few, if any, adverse environmental effects. Nonetheless, the ammonia must be reclaimed and this entails certain costs. Further details of this technique are described in U.S. Pat. No. 5,037,663 issued to Bruce E. Dale, the subject matter of which is incorporated herein by reference.

Grinding methods have been tried to essentially chop the biomass into pieces small enough for effective sugar hydrolysis. These attempts have not resulted in commercially acceptable sugar yields even though the biomass has been ground to particle sizes as small as 37 microns. This technique requires no chemicals, so chemical recovery is not a problem. The drawback to grinding is that it is very energy intensive, inefficient, and an expensive means of disintegrating fibrous biomass. Most grinding methods essentially cut the end off of the fiber bundle time after time. The fiber bundle is strongest perpendicular to the fiber axis, and it is in this perpendicular direction that most of the cutting is done. To achieve very small particle sizes, the biomass accordingly must be ground repeatedly. Consequently, such grinding consumes a great deal of energy making grinding simply uneconomical as a means of treatment. Moreover, grinding has been shown to be ineffective as a treatment. The cost of grinding is prohibitive based on the energy consumption alone, not taking into account equipment costs, including the cost of repair and general wear of the machinery.

Strong alkali agents have been used in conjunction with shear forces produced by an extruder device to both chemically and physically disintegrate fibrous biomass. This technique uses a mixture of a strong alkali and a peroxide combined with biomass. The technique requires solids loadings in excess of 30% solids. The alkali-peroxide/biomass broth is exposed to shear forces in an extruder device. The extruder device has a masticatory effect on the biomass, grinding and chewing the particles. The extruder is particularly used for its mixing capabilities, i.e., dispersing the biomass in the alkali-peroxide mix; however, when high-shear mixing is accomplished, structural disintegration occurs. While producing high-shear forces, an extruder functions similar to a grinder. The resulting broth is then held in residence for up to 24 hours to complete the process.

This method requires the use of potentially toxic chemicals. It also may require extended treatment times, up to 24 hours. Recovery of the alkali and peroxide is not necessarily required, but special care must be used in handling these toxic chemicals. This method accordingly is expensive due to the handling costs, and can be inefficient due to the time required for treatment. Further details of this technique are described in U.S. Pat. No. 4,997,488 issued to John M. Gould and Brian J. Jasberg, the subject matter of which is incorporated herein by reference.

High-frequency, rotor-stator devices have been used to aid in disintegrating starch-containing agriculture products like corn and tubers prior to refining the starch to alcohol. Corn and other starch-containing materials, however, have little or no lignin associated with their cell structure; and their cell structure is minimally fibrous when compared with a fibrous lignocellulosic biomass. Consequently, while starch-containing materials have been subject to mechanical breakdown by the use of rotor-stator devices, it has been generally considered that these devices would not be effective in breaking down lignocellulose-containing materials. Furthermore, this process is not used commercially because the process did not prove effective in preparing starch for ethanol production.

Hardwood having a lignin content from 20-23% has been subjected to high-frequency, rotor-stator devices as an adjunct to furfural production. In these instances, the wood was first ground and the particles "cooked" with dilute acid at high temperature before use of high-frequency, rotor-stator devices. A coarse rotor-stator device, known as a conical tool marketed under the trade name SUPRATON by Krupp Industrietechnik GmbH, was used primarily for its dispersion capability, i.e., to disperse the wood particles in the high temperature, acid broth. This process has the same drawbacks as the dilute acid process because it requires separation of the acid and toxic by-products from the desirable sugars. The process also creates a toxic waste stream resulting from the separation of the sugars from the mix. Furthermore, the effectiveness of this method was minimal.

SUMMARY OF THE INVENTION

The present invention in a general aspect comprises a method of reducing the particle size of a fibrous biomass containing lignocellulose, wherein an aqueous slurry of particles of the biomass is injected cross-currently into a turbulent Couette flow of the slurry. The injected slurry is also preferably in turbulent flow. The Couette flow occurs in a narrow channel or gap between a first stationary surface and a second surface traveling at high speed. The resulting turbulence has proven very effective in not only reducing the particle size of a fibrous biomass but also shearing or splitting the fibers in such a way that the cellulose in the biomass becomes especially exposed or susceptible to subsequent hydrolysis.

Preferably, the biomass feed is forced to be injected into a succession of the channels or gaps mentioned above. Thus, once a quantity of biomass has been injected into a first channel or gap and mixed with another quantity of biomass traveling in turbulent Couette flow, a first portion of the resulting first mixture is injected into a second such channel to mix with still another quantity of the biomass. At the same time, a second portion of the first mixture continues to flow in the first channel, where it preferably encounters an injection of still another quantity of the biomass.

Preferably, all of the stationary surfaces and rapidly moving surfaces which define the Couette channels or gaps form parts of a stator and a rotor, respectively. Several actual devices which incorporate such stators and rotors are machines currently available under the names SUPRATON TM and DISPAX P/2 TM. All of these devices have a plurality of generally parallel channels defined between a stator and an adjacent rotor by lands or walls which run around each stator and rotor. Each such land or wall is crenelated to provide a plurality of openings for slurry to either enter into a channel between the lands or to exit from that channel to an adjacent channel. In operation, pulses or slugs of slurry are injected into a given channel to generate pressure pulses in the channel. Then, as the mixed slurry in the channel moves and lines up with an opening leading to the next channel, a slug of the mixture exits the first channel and enters into the next channel where it is injected into a new body of slurry in turbulent Couette flow. This pulsing type of flow from one channel to the next causes the slugs to experience pressure changes which, it is concluded, assist greatly in causing fibers in the slugs to erupt and shear axially. The several mechanisms that occur in this system are not entirely understood, but the results in terms of shredding the fibers in a biomass and improving the hydrolysis of cellulose components in the biomass have been unexpectedly significant. It has been especially noted that the fibers have been sheared axially as well as transversely, thus opening the fibers to a marked degree. It appears that the pulsing, turbulent nature of the overall flow pattern gives rise not only to high-shearing actions but also to microcavitational effects which promote fiber destruction.

There is minimal grinding in the process of the invention, because there is approximately a 1 mm. space between the rotor and the stator of the rotor-stator devices used in the invention; and particle sizes are generally less than 1 mm. before the slurry is created. High-shearing forces created by the rotor in each ring-shaped path shred the fibrous particles as they pass from one path to the next. As they pass from one ring to another, microcavitation forces help to explode the fibrous particles concurrently with the shearing action.

The particles generated by the several forces vary in size from very fine, about 1-5 microns, to relatively large, about 1-2 mm. The particles also exhibit greatly increased surface area due to the internal disruption of the fibers, allowing easier penetration by the enzymes used in sugar hydrolysis.

BRIEF DESCRIPTION OF THE DRAWINGS

FIGS. 5-8 are graphic representation of the results of examples 1 and 2.

DETAILED DESCRIPTION OF THE INVENTION

As stated above, the present invention uses high-frequency, rotor-stator shearing technology in the treatment of a lignocellulosic biomass. This type of device produces high-shear, microcavitation forces which disintegrate the biomass fed into it. Two commercially produced high-frequency, rotor-stator dispersion devices are the Supraton TM devices manufactured by Krupp Industrietechnik GmbH and marketed by Dorr-Oliver Deutschland GmbH of Connecticut, and the Dispax TM devices manufactured and marketed by Ika-Works, Inc. of Cincinnati, Ohio.

Raw materials for the present process comprise cellulose-containing materials such as hay, sugar cane bagasse, crop residues, newsprint, paper, sewage sludge and yard wastes. Preferred is non-woody biomass which pertains to cellulose-containing material having generally a lignin content of 18 percent or less. Thus, biomass in the form of tree bark or wood chips from trees would not be preferred starting materials for the present process, although it is contemplated that cellulose-containing material from woody plants such as aspens and other ashes would be suitable for the present treating process.

To prepare the biomass for shearing, the biomass is first reduced to a dry powder form by grinding, to classify out tramp materials which might damage the rotor-stator shearing device. Grinding to a desired dry powder form may be accomplished in one or more stages. In a preferred embodiment, the milled biomass is ground in a conventional tub grinder to a particle size sufficiently small enough to pass through number 3 mesh sieve. The ground biomass is then fed to a hammermill, or to a series of hammermills, and reduced to a particle size sufficiently small enough to pass through a number 20 mesh sieve.

The ground product is preferably mixed with water to obtain a slurry of a desired solids content. One of the purposes of this portion of the process is to further defibrate the biomass. In a preferred embodiment, the dry powder is fed into a hopper and conveyed to a mixer-grinder-pump and water added to form a slurry having a solids content of up to about 60 percent solids. In a preferred embodiment, the mixer-grinder-pump is a medium shear, rotor-stator device capable of mixing and pumping high solid content slurries. This device further reduces the particle size of the biomass, wets the particles thoroughly with water, and disperses the particles within the water. Examples of this type of device are the HED TM manufactured and marketed by Ika Works, Inc. of Cincinnati, Ohio and the Gorator TM manufactured by Krupp Industrietechnik GmbH and marketed by Dorr-Oliver Deutschland GmbH of Connecticut.

Figure 1:
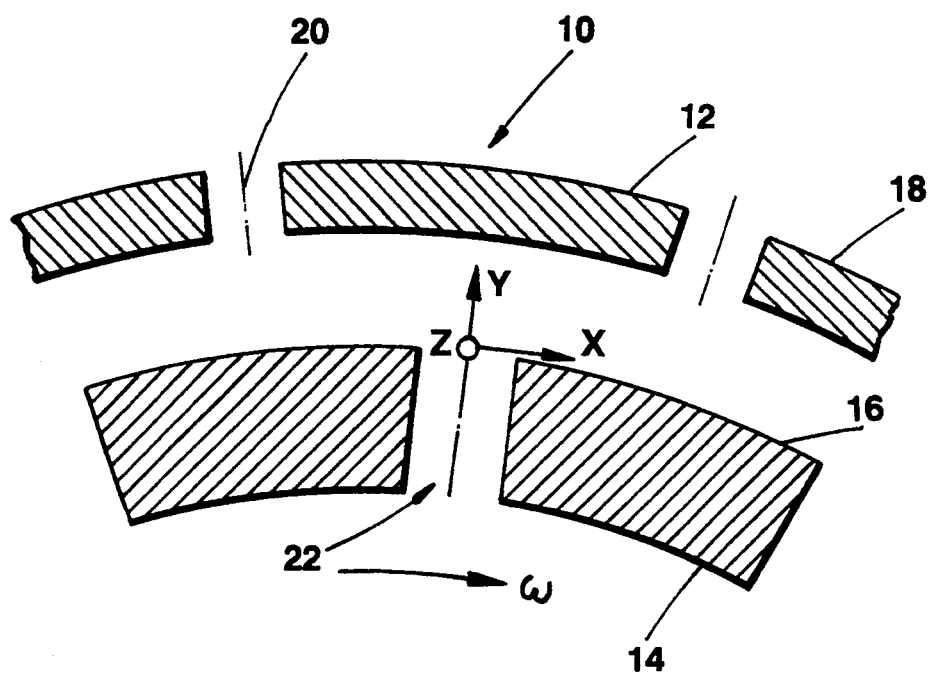
FIG. 1 is a schematic axial view of a portion of a rotor/stator device.

In a preferred embodiment of the process, the slurry is pumped into a high-frequency, rotor-stator dispersion device where it is subjected to high-shear mixing of two turbulent streams as described earlier. As mentioned earlier, preferred high-frequency, rotor-stator dispersion devices are the Supraton TM and the Dispax TM devices. Referring to FIG. 1, a slurry is fed into the high-frequency, rotor-stator device and forced into a chamber 10. Inside the chamber is a series of coaxial meshing rings of teeth. The rings are concentric, radiating out from the center. The rings 12 on the stator are fixed and the rings 14 on the rotor are rotated by a shaft. The teeth 16 on the rotor and the teeth 18 on the stator are closely spaced at close tolerances. The space between the teeth of the rotor and stator is typically about 1 mm.

Adjacent pairs of teeth are separated by gaps 20 and 22. The tooth and gap size determine the coarseness or the machine, i.e., a coarse tool has fewer teeth with larger gaps between adjacent teeth when compared with a medium or fine tool. Both the Supraton TM and Dispax TM allow the use of coarse, medium, and fine toothed rings in the same device, or the devices can have all coarse, all medium, or all fine toothed rings in the chamber so that the machines may be used in series.

As the slurry is pumped under pressure into the chamber 10 by the mixer-grinder-pump, it encounters each concentric layer of teeth as the slurry is forced laterally. This lateral force is created by the pressure on the slurry as it is pumped into the chamber by the mixer-grinder-pump and by the centrifugal force created by the spinning rotor. The slurry passes through the gaps between the teeth as the rotor spins past the gaps in the stator. Flow is most pronounced when the gaps 22 between the rotor teeth align with the gaps 20 in the stator. The result is a pulsing flow with a rapid succession of compressive and decompressive forces. The lignocellulosic material in the slurry is subjected to these repeated forces, as the centrifugal force accelerates it through the gaps toward the outer edge of the chamber. The repeated compressive and decompressive forces create microcavities in the slurry with extremely intensive energy zones. The lignocellulosic fibers are ripped apart by this intensive energy.

As the lignocellulosic particles pass outward through the various gaps, they also come in contact with the teeth. Some grinding of the particles occurs due to such contact. The grinding effects are relatively small, however, when compared with the combined effects of shear and microcavitation.

Grinding typically cuts, slices, and dices fibrous material perpendicular to the fiber bundle, producing a more spherical type of particle. Shear in combination with microcavitation, on the other hand, tends to shatter the material, that is, it rips the fibers apart from the inside-out forming irregularly shaped particles. Examination of these particles show them to have been "cut" both perpendicular to the fiber axis and longitudinally along the fiber axis. The effect on the fibers is to shatter their structure, disrupting the lignin bonding to cellulose. Shattering the individual particles of the biomass results in a particulate substrate which is more readily penetrated by the desired enzymes used in sugar hydrolysis.

As previously stated, high-frequency, rotor-stator dispersion devices may have differently configured rings or "tools" within the chamber. These tools, for example, may vary in the gap size between the teeth on the rings. With a larger gap size, the resulting material is more coarse than with a smaller gap size. As stated earlier, these tools can be varied within one device to contain coarse, medium, and fine rings in the chamber of the device. Likewise, a device may contain rings of the same rating so that the devices can be staged. This capability is important for use in a continuous process.

Processing a fibrous biomass through one or more of the high frequency, rotor-stator dispersion devices renders the fibrous material especially well suited for subsequent hydrolysis of the cellulose components. The fibers have been thoroughly shredded, and the associated cellulose material is readily available for hydrolytic attack. Thus, the treated biomass may be made to undergo acid or enzymatic hydrolysis or direct microbial conversion to produce $C_5$ and $C_6$ sugars. These sugars may then be fermented and distilled into fuel ethanol. Use of the rotor-stator devices typically reduces the need for other treatments normally used to prepare a biomass for hydrolysis; however, their use may nevertheless be combined with such other treatments as described later.

One of the main benefits of the method of the invention lies in the ability of the high-frequency, rotor-stator dispersion device to handle high-solids content slurries. This capability facilitates the recycling of previously treated lignocellulose-containing material by allowing the addition of previously treated matter to a newly created slurry. This addition to the newly created slurry increases the solids content of the slurry that enters the high-frequency, rotor-stator dispersion device. Such devices are thought to be able to accommodate slurries containing up to 60% solids.

Generally, continuous processing is favored because it requires less down time for equipment cleaning and other procedures that must be done between batches. Consequently, continuous processing is more efficient and economical. Because the method of the invention allows for recycling of previously treated biomass, the method of the invention may be used in continuous, fed-batch, semi-batch, or batch processing. Consequently, the present invention offers the operator flexibility in how the processing plant is set up and operated.

A particular benefit of the method of the invention is that it can be accomplished at temperatures compatible with enzyme activity. For example, unlike a number of other methods, this procedure may be accomplished at temperatures from about 35° C. to about 70° C. A preferred temperature is about 47°–62° C., because cellulase activity is optimum at that temperature. It should be understood that should enzymes be developed that are effective at higher temperatures, the present invention could accommodate the higher temperatures.

Figure 2:
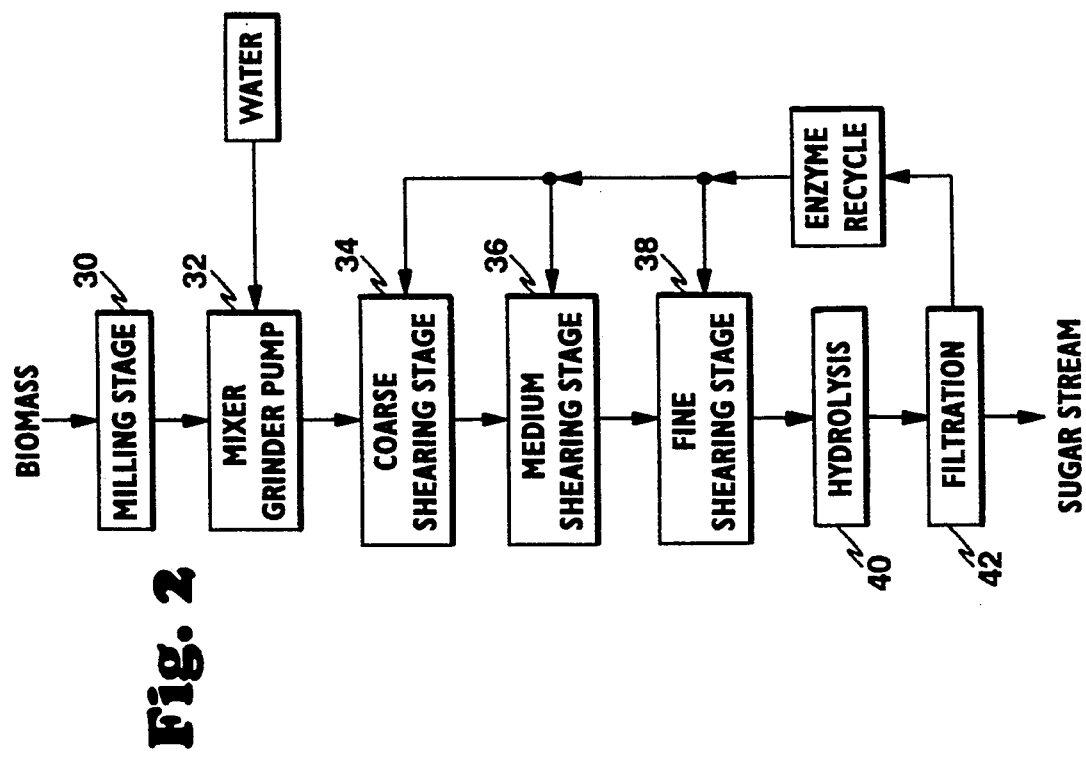
FIG. 2 is a flow diagram depicting an example of the invention carried out in the presence of water alone.

FIG. 2 illustrates an embodiment of the invention which is preferred for use on grasses and other biomass of low lignin content. In this embodiment a fibrous lignocellulosic biomass is ground in stage 30 to a dry flour. This flour is combined with water in a mixer-grinder-pump in stage 32 to form a slurry. The resulting slurry is sheared in a series of rotor-stator devices, passing through a coarse device 34, then a medium device 36, and finally a fine device 38.

As explained earlier, the complex forces created by each rotor-stator device shatter, shred, and disintegrate the lignocellulose particles in the slurry. The net effect has been unexpected, literally exploding the fibers and ripping them apart. Electron microscope studies show that the effect begins internally within the fibers. The resulting particles are very small and due to the internal disruption of the fiber structure, the reactive surface area of the fibers is greatly increased.

Following the shearing stages, the lignocellulose particles may be treated with a suitable enzyme such as cellulase mid hydrolyzed 40. Alternatively, the slurry from stage 38 may be blended with an enzyme and further sheared in a rotor-stator dispersion stage before being hydrolyzed.

Following hydrolysis, the biomass is separated by filtration or other suitable technique 42 into a retentate and a tilt rate containing soluble sugars. The retentate may be recycled back to the shearing stages for further processing. Lignocellulose particles treated with cellulase are typically laden with useful enzymes following such treatment. Typically, the enzymes remain tightly adsorbed onto the remaining biomass fibers. Recycling the previously treated material through one or more shearing stages aids in separation of the enzymes from the biomass particles. Once removed from the biomass particles, the enzymes may be simultaneously blended with freshly treated biomass. Thus, recycling enables reuse of enzymes and more complete breakdown of cellulose and hemicellulose.

Figure 3:
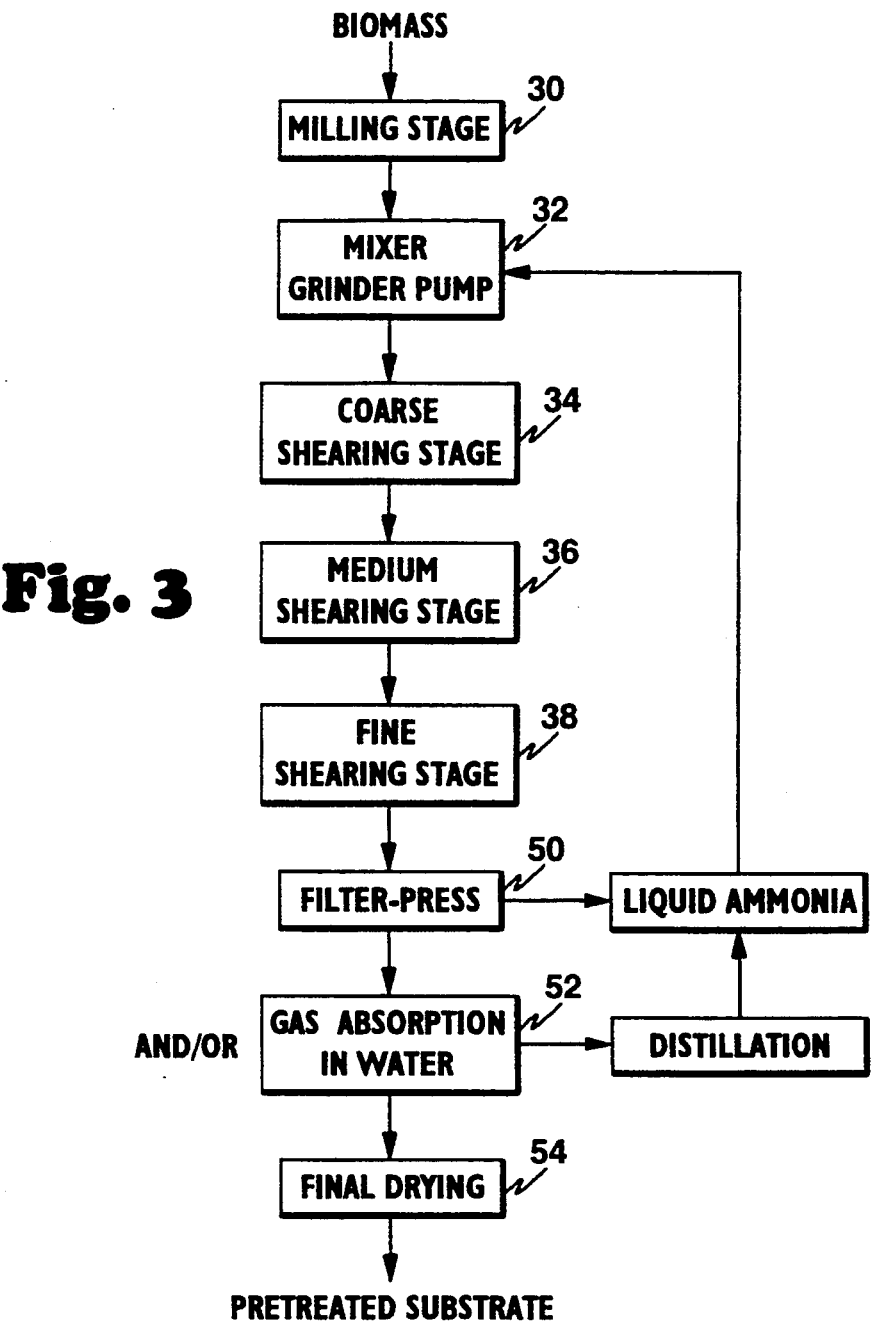
FIG. 3 is a flow diagram depicting an example of the invention carried out in the presence of liquid ammonia.

FIG. 3 depicts an embodiment of the process which is preferred for use with biomass containing 18% or more lignin. After grinding the biomass into a dry flour in stage 30, a slurry is produced in stage 32 by mixing the dry flour with liquid ammonia. The resulting slurry may contain up to about 60% solids. The slurry is pumped into one or more shearing stages in accordance with the invention, preferably using a coarse rotor-stator device, then a medium device, and finally a fine device. The slurry is then filtered 50, preferably using a Tube Filter Press by English China Clays of England to remove the majority of the liquid ammonia. Remaining ammonia is gasified and removed by water absorption 52. Any further remaining liquid ammonia may then be removed by lowering the pressure on the particulate substrate in a drying stage 54.

The resulting dried substrate containing sheared lignocellulose particles may be passed directly to hydrolysis. Alternatively, the dried substrate may be further sheared by using one or more high-shear, rotor-stator devices in the presence of water alone or water and enzymes prior to hydrolysis.

In another embodiment of the invention, after the biomass is ground, the dry flour is mixed with liquid ammonia to create a solution wherein the liquid ammonia is in a ratio of 4 to 1 (w:w) to the solids. The resulting mixture is then held in residence for up to one hour. The mixture is filtered, preferably with a Tube Filter Press made and sold by English China Clays of England to remove the liquid ammonia. Any remaining ammonia is then gasified and removed by water absorption. The remaining lignocellulosic particles are dried by lowering the pressure. The resulting dry lignocellulose particles may be passed directly to hydrolysis. Alternatively, the dry particles may be further sheared by using one or more high-shear, rotor-stator devices in the presence of water alone or water and enzymes prior to hydrolysis.

In another embodiment of this invention, after grinding a lignocellulose-containing biomass to a dry flour, a mixture is created by combining the flour with liquid ammonia. A mixture is created wherein the liquid ammonia to lignocellulose-containing flour is about 4.0 to 1 (w:w). The resulting mixture is held in residence for about one hour. The mixture is then heat dried to remove the majority of the liquid ammonia. Any remaining liquid ammonia is then gasified and removed by water absorption. The lignocellulose-containing particles are then further dried by lowering the pressure thereby driving off any remaining ammonia. The resulting dry lignocellulose particles may be passed directly to hydrolysis. Alternatively, the dry particles may be further sheared by using one or more high-shear, rotor-stator devices in the presence of water alone or water and enzymes prior to hydrolysis.

Figure 4:
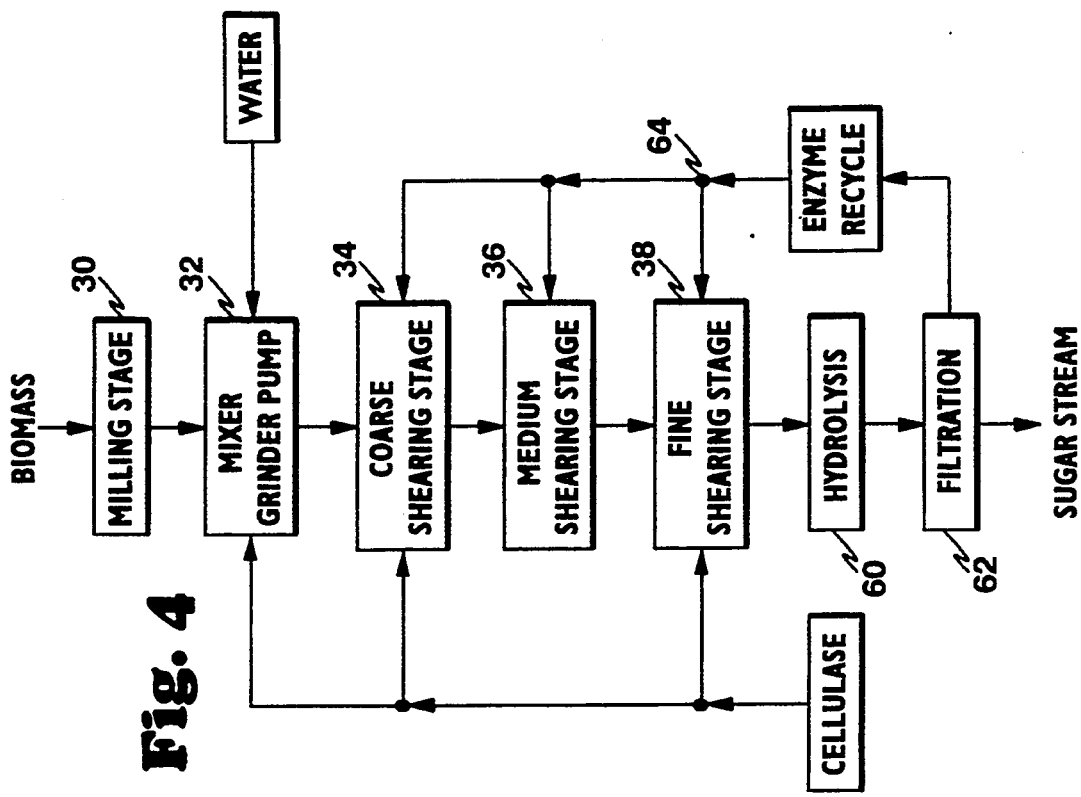
FIG. 4 is a flow diagram depicting an example of the invention carried out in the presence of water and enzymes.

FIG. 4 depicts an embodiment of the process which is preferred for initiating enzymatic hydrolysis. In Stage 30 lignocellulose-containing biomass is ground. A slurry is created using water and additionally, enzymes in a mixer-grinder-pump in stage 32. Cellulase, cellobiase, or a combination of the two enzymes is added to the slurry before exposure to the high-frequency, rotor-stator dispersion device. It is contemplated that these enzymes may be added directly into the shearing stages, in addition to the slurry. This allows for titration to achieve effective enzyme levels. In addition to the enzyme, a surfactant, preferably a nonionic surfactant, is added to slurry. Those nonionic surfactants having a polyoxyethylene glycol group are especially preferred. The amount of surfactant added will vary, but a concentration of 0.05 % (wt/substrate wt) is optimum for POG (21) sorbitane oleic ester. The purpose of the addition of the surfactant is to reduce the adsorption of enzyme onto the substrate. By adding surfactant, the enzymes remain more active and shorten the time required for enzymatic hydrolysis is expected to be shortened.

The slurry is pumped into one or more shearing stages, preferably a coarse rotor-stator device, then a medium device, and finally a fine device. The benefits of this process are that the lignocellulosic particles are shattered and shredded while they are being exposed to the enzymes. It is contemplated that this process will be more efficient than treating the biomass by subjecting it to high-shearing forces, then treating the resulting substrate with enzymes. By combining the shearing step with hydrolysis, this process should save time and the energy inputs required to shred the biomass in the treatment process.

Following the shearing stages, the enzyme laden substrate is passed into a further hydrolysis stage 60. After hydrolysis, the biomass is separated by filtration or other suitable technique 62 into a retentate and a filtrate. The retentate may be recycled back into the shearing stages as seen in stage 64. Lignocellulose particles treated with cellulase are typically laden with useful enzymes following such treatment. Recycling these particles enables reuse of the enzymes and more complete breakdown of the lignocellulose.

An additional benefit of this process is that new material may be added to the slurry while, at the same time, material that has been already treated with the enzymes may be recycled back into the shearing stages allowing for continuous processing. The enzymes used are expensive and have a short half-life. The ability to process the material continuously and recycle enzyme containing substrate lengthens the useful life of the enzymes by making their reuse practical. Further, it is contemplated that this will allow more thorough sugar hydrolysis of the substrate because the biomass particles are continually exposed to the enzymes by way of recycling the treated particles through the process. The result is a more efficient process.

At this time, there are no known commercial continuous refining processes; all are done by the batch method. This process allows continuous processing which, in turn, will allow biomass refining on a larger scale than that allowed by batch processing. Continuous processing is more efficient than batch processing because the system does not have to be shut down and readied for another batch.

It is an advantage of the method of the invention that it can be done with water alone and without the use of acids or alkali as have been used in the prior art. However, the method of the invention is flexible enough to encompass the use of acids or alkali and to some advantage.

The use of acids and alkali is generally directed toward woody biomass with lignin content of 18% or more. Both acids and alkali are effective for lignin removal. As is well known to those skilled in the art, acids and alkali are also effective to hydrolyze the $C_5$ sugars in biomass.

Thus, in the case of alkali, a lignocellulosic biomass containing 18% or more lignin is ground to a dry flour, and a slurry is created by combining the flour with a non-volatile alkaline reagent in a mixer-grinder-pump. Lime and NaOH are examples of suitable non-volatile alkaline reagents. The resulting slurry is sheared in a series of rotor-stator devices, passing through a coarse device, then a medium device, and finally a fine device. It is contemplated that the alkaline reagent will be recovered through a chemical separation process. Following chemical separation a final drying step is used. The resulting dry lignocellulose particles may be passed directly to hydrolysis. Alternatively, the dry particles may be further sheared in one or more high-shear, rotor-stator devices in the presence of water alone or water and enzymes prior to hydrolysis.

In the case of acids, a lignocellulosic biomass containing 18 % or more lignin is ground to a dry flour, and a slurry is created by combining the dry flour with up to 1% by weight sulfuric acid at temperatures below that which will convert $C_5$ sugars to furfural. It is contemplated that this process may also be performed at 47°-62° C. rather than the much higher temperatures normally used with acids. The resulting slurry is sheared in a series of rotor-stator devices, passing through a coarse device, then a medium device, and finally a fine device. The mixture is centrifuged to remove the acid leaving behind a particulate substrate. Water is added to the particulate substrate to form a slurry. The slurry is sheared in a series of rotor-stator devices, passing through a coarse device, then a medium device, and finally a fine device. The resulting lignocellulose particles may be passed directly to hydrolysis. Alternatively, the particles may be further sheared in the presence of water and enzymes prior to hydrolysis.

The following examples describe actual systems studied for treating lignocellulose-containing biomass and illustrate the invention in more detail. The examples are based on work with coastal bermuda grass; however, the principles ascertained have application with other lignocellulose-containing biomass as well. The invention is a broad concept and is applicable to treating lignocellulose-containing biomass in general. The following examples, accordingly, shall not be construed as limiting the scope of the invention.

EXAMPLE 1

Coastal bermuda grass hay was ground to a particle size sufficiently small enough to pass through size 40 mesh sieve and mixed in tap water to create a slurry of approximately 14% solids. This material was fed, without heating through a progressive-cavity pump which introduced the slurry into a Dispax ™, a high-frequency, rotor-stator device, manufactured and marketed by Ika Works, Inc. of Cincinnati, Ohio. The slurry was circulated through one Dispax ™ device. The Dispax ™ had coarse, medium, and fine rings in the chamber. The biomass so treated was designated "CMF" for coarse, medium and fine.

Following treatment in the Dispax ™ device, the sample was pasteurized at 70° C. and a buffer added to bring the pH of the mixture to 5.0. The samples were divided into three separate samples of equal amount. One sample was treated with 5 International Units of cellulase per gram of dry hay. Fifteen IU's of cellobiase was added in the sample brought to a temperature of 55° C. A second sample was treated with 7 International Units of cellulase per gram of dry hay. Twenty-one IU's of cellobiase was added and brought to a temperature of 55° C. A third sample was treated with 10 International Units of cellulase per gram of dry hay. Thirty IU's of cellobiase was added to the mixture and the entire mixture was brought to a temperature of 55° C. Aliquots were taken at periods of 8 minutes, 60 minutes, 12 hours, 24 hours and 48 hours, and the resulting sugars measured by total reducing sugars (DNSA) analysis.

The results were compared against published results for ammonia explosion ("AFEX") treatment of coastal bermuda grass followed by enzymatic hydrolysis. The ammonia explosion process was performed wherein the ammonia was in a 1:1 ratio with the biomass. After treatment, the substrate was hydrolyzed with 5 International Units of cellulase per gram of dry hay. Additional cellobiohydrolase was added and the mixture brought to a temperature of 55 ° C. Aliquots were taken at 8 minutes, 60 minutes, 12 hours, 24 hours, and 48 hours, and the reducing sugars measured by total reducing sugars (DNSA) analysis. The results were measured in milligrams of sugar per gram of dry substrate.

Figure 5:
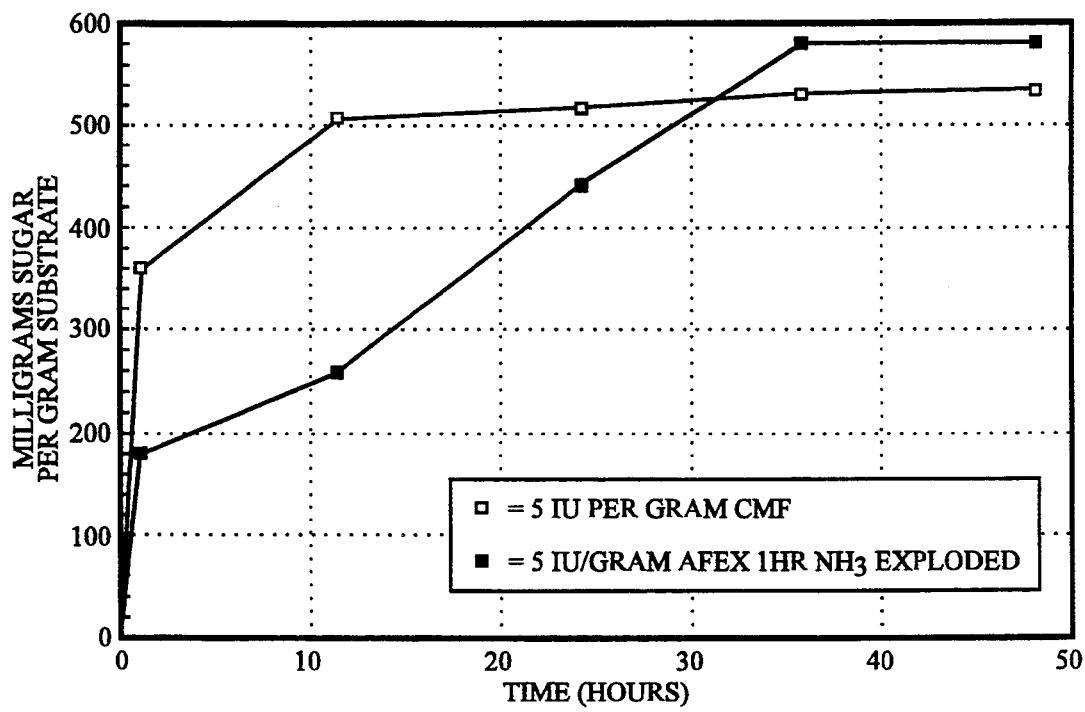
FIGS. 5-8 compare sugar hydrolysis results of biomass samples treated using the method of the present invention and samples treated using a method of the prior art applying different operating parameters.
Figure 6:
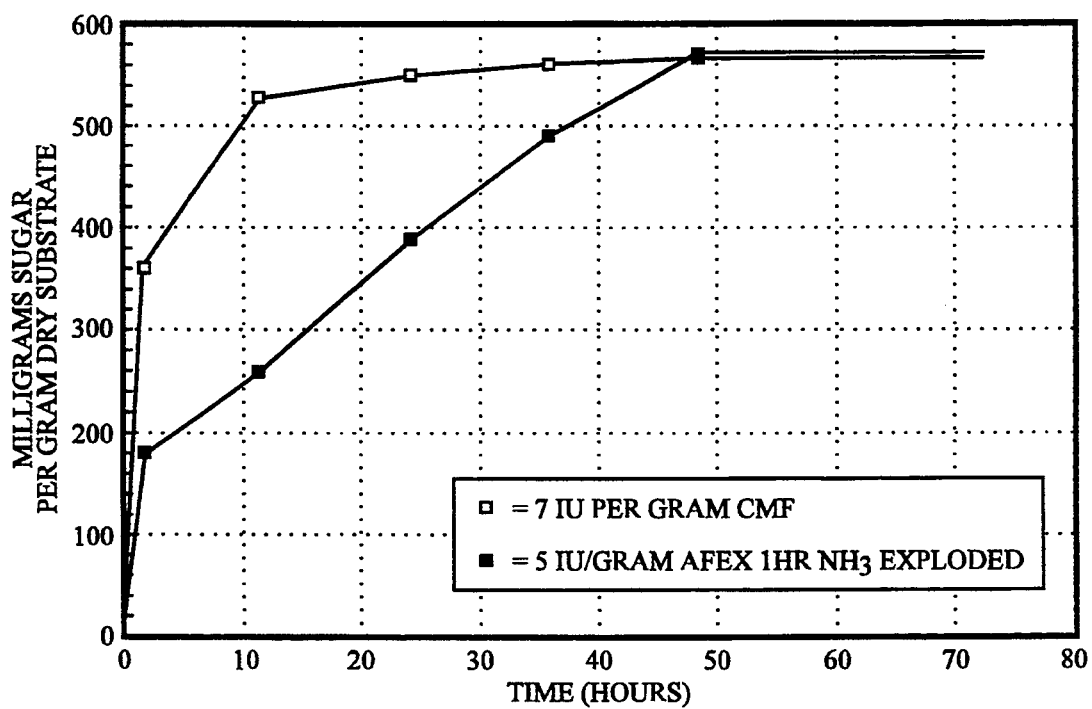
Figure 7:
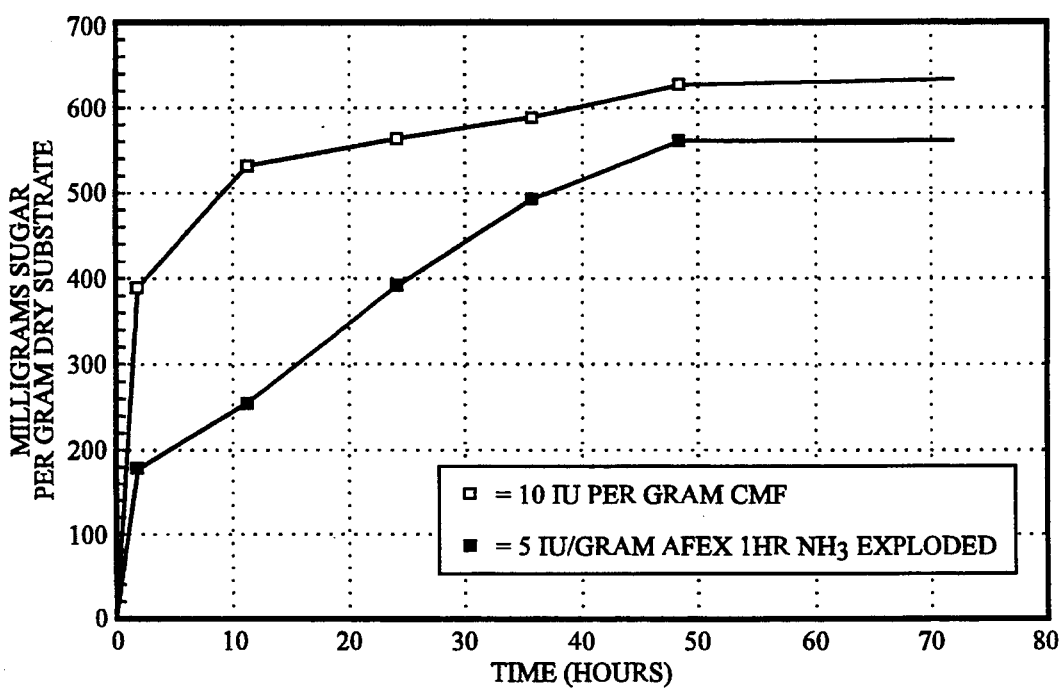

FIGS. 5, 6 and 7 present the results obtained in the above studies. Thus, the use of high-shearing forces in water provided sugar yields equal to the ammonia explosion treatment, and faster initial sugar yields.

EXAMPLE 2

The treatment was performed exactly the same as in Example 1. The sample was then pasteurized to 70° C. and a buffer added to bring the pH to 5.0. The sample was then treated with 5 International Units of cellulase per gram of dry hay. Additional cellobiohydrolase was added and the sample was brought to a temperature of 55° C.

The results were compared against published results for ammonia explosion treatment of coastal bermuda grass hay. For this experiment, however, the ammonia explosion process was performed with an ammonia to hay ratio of 2:1. The sample was then treated with 5 International Units of cellulase per gram of dry hay. Additional cellobiohydrolase was added and the entire sample was brought to a temperature of about 47°–48° C. Aliquots were taken from each sample at 8 minutes, 60 minutes, 12 hours, 24 hours and 48 hours, and the resulting sugar content of each aliquot was measured by total reducing sugars (DNSA) analysis.

The results were expressed in milligrams of sugar per gram of dry substrate.

Figure 8:
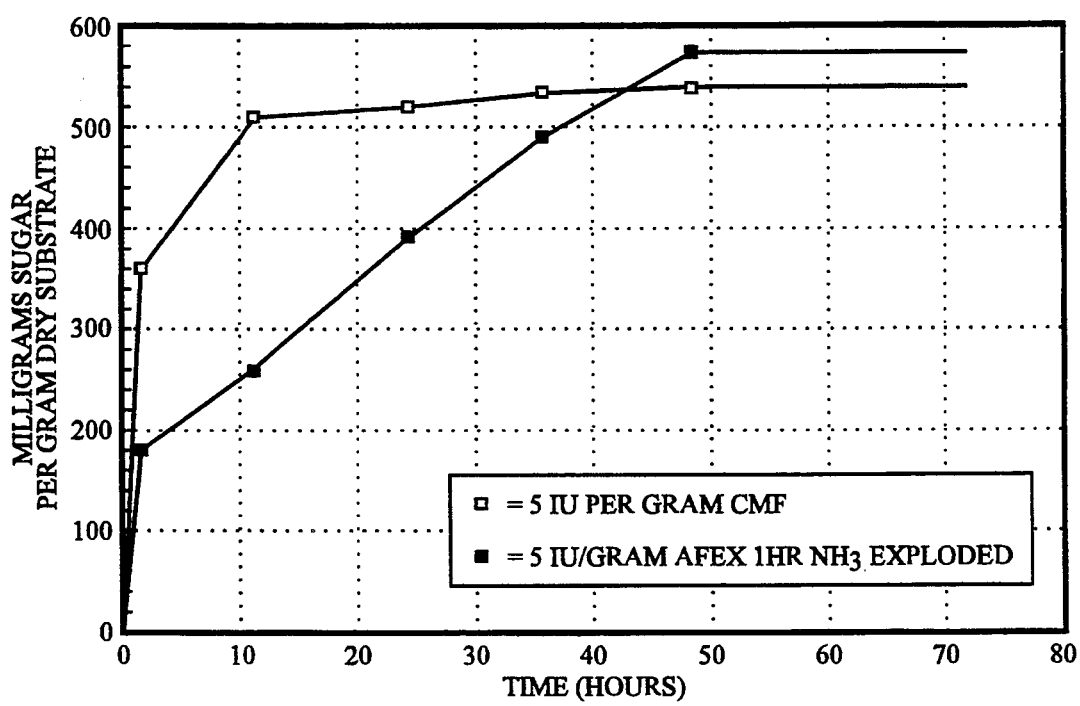

FIG. 8 presents the results obtained in the above study. Thus, the use of high-shearing forces in water produced sugar yields superior to the 2:1 ammonia explosion treatment for the first 40 hours of hydrolysis.

The foregoing was for purposes of illustrating the invention. Those skilled in the art will recognize that various modifications can be made to the invention, and all such modifications are incorporated within the spirit and scope of the invention.

What is claimed is:

1. A method of treating a fibrous lignocellulosic biomass to make it more susceptible to hydrolysis, comprising the following steps:
    (a) reducing the particle size of the lignocellulosic biomass to produce a dry flour;
    (b) mixing the flour with water to produce a slurry ranging up to about 60% solids; and
    (c) subjecting the slurry to high-shear forces by injecting the slurry cross currently into a turbulent Couette flow created in a high-frequency, rotor-stator device under conditions to microcavitate the slurry to shatter the fibrous structure of the biomass in the slurry creating a sheared slurry, said device comprising a chamber containing a fixed stator equipped with coaxial toothed rings meshing with opposing coaxial toothed rings coupled to a rotor that is coupled to a rotatable shaft.

2. The method of claim 1, further comprising:
    (d) mixing the sheared slurry from step (c) with an enzyme to form a mixture; and
    subjecting the mixture to said high-shear forces in said turbulent Couette flow created by said device under conditions to microcavitate the mixture to form a sheared mixture.

3. The method of claim 2, wherein the enzyme comprises cellulase, cellobiase, or a combination of cellulase and cellobiase.

4. The method of claim 2, wherein the mixture further comprises a nonionic surfactant.

5. The method of claim 4, wherein the surfactant possesses a polyoxyethylene glycol group.

6. The method of claim 2, further comprising:
    (e) separating the sheared mixture from step (d) producing a filtrate and a retentate;
    adding the retentate to a newly formed sheared slurry from step (c) forming a mixture; and
    simultaneously adding an enzyme to the mixture and subjecting the mixture to said high-shear forces in said turbulent Couette flow created by said device under conditions to microcavitate the mixture.

7. A method of treating lignocellulosic biomass to make it more susceptible to hydrolysis, comprising the steps of:

(a) mixing a lignocellulosic biomass flour with water to produce a slurry; and (b) subjecting the slurry to high-shear forces by injecting the slurry cross currently into a turbulent Couette flow created in a high-frequency, rotor-stator device under conditions to microcavitate the slurry to shatter the fibrous structure of the biomass in the slurry creating a sheared slurry, said device comprising a chamber containing a fixed stator equipped with coaxial toothed rings meshing with opposing coaxial toothed rings coupled to a rotor that is coupled to a rotatable shaft.

8. The method of claim 7, further comprising:

(c) simultaneously adding an enzyme and a surfactant to the sheared slurry from step (b), and subjecting the sheared slurry to said high-shear forces in said turbulent Couette flow created by said device under conditions to microcavitate the sheared slurry.

9. The method of claim 8, wherein the enzyme comprises cellulase, cellobiase, or a combination of cellulase and cellobiase.

10. The method of claim 8, wherein the surfactant comprises a nonionic surfactant having a polyoxyethylene glycol group.

11. The method of claim 8, further comprising:

(d) separating the sheared slurry from step (c) producing a filtrate and a retentate;

(e) adding the retentate to a newly formed sheared slurry from step (b) to form a mixture; and simultaneously adding an enzyme and a surfactant to the mixture and subjecting the mixture to said high-shear forces in said turbulent Couette flow created by said device under conditions to microcavitate the mixture.

12. A method of treating lignocellulosic biomass to make it more susceptible to hydrolysis, comprising the following steps:

(a) mixing a lignocellulosic biomass flour with water, an enzyme capable of converting cellulose and hemicellulose to sugars, and a surfactant to form a slurry; and (b) subjecting the slurry to high-shear forces by injecting the slurry cross currently into a turbulent Couette flow created in a high-frequency, rotor-stator device under conditions to microcavitate the slurry to shatter the fibrous structure of the biomass in the slurry creating a sheared slurry, said device comprising a chamber containing a fixed stator equipped with coaxial toothed rings meshing with opposing coaxial toothed rings coupled to a rotor that is coupled to a rotatable shaft.

13. The method of claim 12, wherein steps (a) and (b) are performed simultaneously.

14. The method of claim 12, wherein the enzyme comprises cellulase, cellobiase, or a combination of cellulase and cellobiase.

15. The method of claim 12, wherein the surfactant comprises a nonionic surfactant having a polyoxyethylene glycol group.

16. The method of claim 12, further comprising:

(c) separating the sheared slurry from step (b) producing a filtrate and a retentate;

(d) adding the retentate to a newly formed sheared slurry from step (b) forming a mixture; and simultaneously adding an enzyme and a surfactant to the mixture and subjecting the mixture to said high-shear forces in said Couette flow created by said device.

17. A method of treating lignocellulosic biomass to make it more susceptible to hydrolysis, comprising the following steps:

(a) mixing a lignocellulosic biomass flour with water, an enzyme capable of converting cellulose and hemicellulose to sugars, and a surfactant to form a slurry;

(b) subjecting the slurry using high-shear forces by injecting the slurry cross currently into a turbulent Couette flow created in a high-frequency, rotor-stator device under conditions to microcavitate the slurry to shatter the fibrous structure of the biomass in the slurry creating a sheared slurry, said device comprising a chamber containing a fixed stator equipped with coaxial toothed rings meshing with opposing coaxial toothed rings coupled to a rotor that is coupled to a rotatable shaft; and (c) mixing the sheared slurry from step (b) with the slurry from step (a) and repeating step (b).

* * * * *